United States Patent [19]
Weidinger et al.

[11] Patent Number: 6,021,877
[45] Date of Patent: Feb. 8, 2000

[54] THRUST PLATE ASSEMBLY

[75] Inventors: Reinhold Weidinger, Uaterspiesheim; Michael Weiss, Dittelbrunn, both of Germany

[73] Assignee: Mannesmann Sachs AG, Schweinfurt, Germany

[21] Appl. No.: 09/149,375

[22] Filed: Sep. 8, 1998

[30] Foreign Application Priority Data

Sep. 5, 1997 [DE] Germany .......................... 197 38 895

[51] Int. Cl.$^7$ .................................................. F16D 13/75
[52] U.S. Cl. ..................................... 192/70.25; 192/111 A
[58] Field of Search ............................... 192/70.25, 111 A

[56] References Cited

U.S. PATENT DOCUMENTS

| | | | |
|---|---|---|---|
| 5,029,687 | 7/1991 | Asada et al. | 192/111 A |
| 5,090,536 | 2/1992 | Asada | 192/70.25 |
| 5,560,463 | 10/1996 | Link et al. | 192/70.25 |
| 5,641,048 | 6/1997 | Von Gaisberg | 192/70.25 |
| 5,690,203 | 11/1997 | Link et al. | 192/70.25 |
| 5,803,223 | 9/1998 | De Briel et al. | 192/70.25 |
| 5,816,379 | 10/1998 | De Briel et al. | 192/70.25 |
| 5,887,689 | 3/1999 | Young | 192/70.25 |

FOREIGN PATENT DOCUMENTS 2 314 893   1/1998   United Kingdom .

*Primary Examiner*—Richard M. Lorence
*Attorney, Agent, or Firm*—Cohen Pontani, Lieberman & Pavane

[57] ABSTRACT

A thrust plate assembly having a housing which can be fastened to a flywheel for common rotation about an axis of rotation. A pressure plate is axially displaceable in the housing and is fixed with respect to rotation relative to the housing and is pressed in the direction of the flywheel by an energy accumulator. A wear adjustment device, with at least one adjustment element which is pretensioned in a wear adjustment direction, is arranged in the support path of the energy accumulator. Further, at least one play sensor arrangement is provided for detecting wear occurring during operation. The at least one play sensor arrangement has a locking element with a counter-engagement formation engaging with the engagement formation at the at least one adjustment element. Further, the locking element has a locking engagement formation which engages or is engageable in a detachable manner with a counter-locking engagement formation, the latter preferably being stationary with respect to the pressure plate. The locking element can be moved by a wear detection element and, in this way, the engagement between the locking engagement formation and the counter-locking engagement formation can be canceled.

18 Claims, 2 Drawing Sheets

THRUST PLATE ASSEMBLY

BACKGROUND OF THE INVENTION

1. Field of the Invention

The present invention is directed to a thrust plate assembly, and more particularly to a thrust plate assembly for a motor vehicle friction clutch with automatic wear compensation.

2. Discussion of the Prior Art

Thrust plate subassemblies for motor vehicle friction clutches with automatic wear compensation are generally constructed so that a pressure plate is pressed by a diaphragm spring in the direction of a flywheel and, accordingly, friction facings of a clutch disk are clamped between the pressure plate and the flywheel. The diaphragm spring is supported at the pressure plate by a wear adjustment device in the form of two adjustment rings which are rotatable with respect to one another and pretensioned in one wear adjustment direction. A play sensor is provided which has a shift portion that penetrates a through-opening in the pressure plate and makes contact with the flywheel when wear occurs. A lever portion is connected with the shaft portion and contacts one of the adjustment rings, so that an adjustment of the wear adjustment device is prevented in the disengaged state when no wear exists. When wear occurs and the shaft portion thus makes contact with the flywheel, the contacting force of the lever portion at the corresponding adjustment ring is reduced by an amount corresponding to the amount of wear. During the subsequent clutch release process, the wear adjustment device can compensate for this force difference by relative rotation of the two adjustment rings until the adjustment rings are again locked.

The play sensor is tilted in the respective through-opening of the pressure plate by, among others, a helical pressure spring, so that the shaft portion is held in the through-opening by a press fit or frictional clamping fit. The frictional clamping fit is temporarily canceled during the wear detection process described above, so that the shaft can be displaced in the through-opening of the pressure plate.

However, securing the play sensor to the pressure plate by means of the frictional clamping fit often leads to the problem of a relatively imprecisely definable fixing force. Thus, vibrations or shaking excitations can also lead to a temporary cancellation of the frictional clamping fit and therefore to the risk that the play sensor will be displaced in an unwanted manner.

SUMMARY OF THE INVENTION

It is an object of the present invention to provide a thrust plate assembly, especially for a motor vehicle friction clutch with automatic wear compensation, which provides high reliability of operation with a simple construction.

Pursuant to this object, one aspect of the present invention resides in a thrust plate assembly, especially for a motor vehicle friction clutch with automatic wear compensation, which has a housing that can be fastened or is fastened to a flywheel for common rotation about an axis of rotation. A pressure plate which is arranged in the housing so as to be fixed with respect to rotation relative to the housing and axially displaceable. An energy accumulator, preferably a diaphragm spring, is supported at the housing on one side and at the pressure plate on the other side and presses the pressure plate in the direction of the flywheel. A wear adjustment device is arranged in the support path of the energy accumulator and has at least one adjustment element which is displaceable for purposes of wear adjustment and is pretensioned in a wear adjustment direction and has an engagement formation. At least one play sensor arrangement is provided for detecting wear occurring during operation in friction facings of a clutch disk, which friction facings can be clamped or are clamped between the pressure plate and the flywheel. The play sensor also adjusts to the detected wear in cooperation with the wear adjustment device. The at least one play sensor arrangement has a locking element with a counter-engagement formation engaging with the engagement formation and with a locking engagement formation which engages or is engageable in a detachable manner with a counter-locking engagement formation. The counter-locking engagement preferably is stationary with respect to the pressure plate, in order to lock the at least one adjustment element with respect to movement in the wear adjustment direction. The at least one play sensor arrangement further comprises a wear detection element by means of which the locking element is movable when wear occurs while the counter-engagement formation remains engaged with the engagement formation. In this way, the locking engagement formation can be disengaged from the counter-locking engagement formation.

In the present invention, the wear adjustment device, i.e., the at least one adjustment element of the latter, is prevented from making the adjusting movement by a play sensor arrangement which is fixedly engaged, i.e., in a positive engagement, with the at least one adjustment element on the one hand and with another component on the other hand. Therefore, cancellation of these engagement states as a result even of very slight shaking movements of the locking element, for example, cannot occur as it does in the prior art with the frictional clamping fit employed therein. Therefore, the thrust plate assembly according to the invention provides very good protection against unwanted adjustment of the wear adjustment device during operation.

The engagement formation and counter-engagement formation and/or the locking engagement formation and counter-locking engagement formation advantageously comprise a toothing, a knurling or the like.

In a particularly simple and operationally reliable construction, the at least one adjustment element is an adjustment element which is displaceable in the circumferential direction for wear adjustment, and is preferably an adjustment ring. The locking element comprises a locking wheel which is carried at a locking element carrier which is preferably parallel to the axis of rotation and is not displaceable with respect to the pressure plate or the housing in the circumferential direction or radial direction. In an arrangement of this kind, the locking element can have a receiving opening for the locking element carrier, the locking engagement formation can be formed at an inner circumferential surface of the receiving opening, and the counter-locking engagement formation can be formed at an outer circumferential surface of the locking element carrier.

In order to be able to disengage the locking engagement formation from the counter-locking engagement formation in a simple manner when wear occurs, the receiving opening and the locking element carrier are adapted to one another with respect to their inner circumference and outer circumference so that the locking engagement formation is disengaged from the counter-locking engagement formation when the receiving opening and the locking element carrier are held approximately concentric to one another.

When the locking element can be brought into engagement, or is engaged, by its locking engagement formation with the counter-locking engagement formation by means of the counter-engagement formation engaging with the engagement formation through the at least one adjustment element which is pretensioned in the wear adjustment direction, it is ensured that the locking element is always pressed into engagement via its locking engagement formation with the counter-locking engagement formation by a predetermined minimum force during operation, in particular when the clutch is engaged.

In order to be able to undo the engagement state between the locking engagement formation and the counter-locking engagement formation, the wear detection element, depending on the state of wear, is displaceable with respect to the locking element and moves the locking element through the action of a disengagement portion of the locking element at a disengagement surface of the locking element in order to undo the engagement of the locking engagement formation with the counter-locking engagement formation. For this purpose, the disengagement surface can be inclined with respect to a displacement direction of the wear detection element.

Since the ring-like or wheel-like locking element moves successively around the locking element carrier as wear increases, the locking element has a recess which surrounds at least some areas of the receiving opening and a surface bordering the recess is constructed in a conical shape and forms the disengagement surface at least in some areas. In this way, it is ensured that the wear detection element can always act on the locking element in a suitable manner, regardless of the state of relative rotation between the locking element and the locking element carrier, in order to move the locking engagement formation of the locking element out of engagement with the counter-locking engagement formation.

Since the wear detection element is displaced with respect to the pressure plate as wear increases, in another embodiment the recess has a depth which changes in the circumferential direction around the receiving opening and the disengagement surface is constructed in a helical shape. In this way, the wear detection element can penetrate farther and farther into the recess in the locking element as wear increases.

In order to ensure that the engagement formation and the counter-engagement formation always engage with one another so as to achieve, on the one hand, a defined control or movement of the at least one adjustment element and, on the other hand, to enable a cancellation of the engagement between the locking engagement formation and counter-locking engagement formation, an engagement depth of the engagement formation in the counter-engagement formation is changeable in such a way that, at a minimum engagement depth, the locking engagement formation engages with the counter-locking engagement formation and that when a threshold engagement depth between the engagement formation and the counter-engagement formation is exceeded the locking engagement formation disengages from the counter-locking engagement formation.

In order to further support the biassing or pretensioning of the locking engagement formation engaging with the counter-locking engagement formation, an arrangement is suggested wherein the locking engagement formation of the locking element is pressed in engagement with the counter-locking engagement formation by a centrifugal force occurring during operation. When wear occurs, the wear detection element moves the locking element opposite to the action of centrifugal force so that its locking engagement formation disengages from the counter-locking engagement formation.

The present invention is further directed to a thrust plate assembly, especially for a motor vehicle friction clutch, comprising a housing which can be fastened or is fastened to a flywheel for common rotation about an axis of rotation. A pressure plate is arranged in the housing so as to be fixed with respect to rotation relative to it and axially displaceable. An energy accumulator, preferably a diaphragm spring, is supported at the housing on one side and at the pressure plate on the other side and presses the pressure plate in the direction of the flywheel. A wear adjustment device is arranged in the support path of the energy accumulator and has at least one adjustment element which is displaceable for purposes of wear adjustment and is pretensioned in a wear adjustment direction. At least one play sensor arrangement with a catch mechanism, which play sensor arrangement prevents the at least one adjustment element from moving in the wear adjustment direction and, when wear occurs, allows a displacement of the at least one adjustment element in the wear adjustment direction. The catch mechanism is pressed by a centrifugal force occurring during operation into a catch position which blocks a displacement of the at least one adjustment element in the wear adjustment direction, and wherein, when wear occurs, the catch mechanism can be moved out of its catch position into a release position allowing the displacement of the at least one adjustment element in the wear adjustment direction.

Due to the defined driving or controlling of the catch mechanism, i.e., cancellation or adjustment of a catching state, it can be provided in a dependable manner that a wear adjustment takes place only when wear actually occurs and that unwanted shaking movements, for example, cannot cause a wear adjustment.

For this purpose, for example, at least one play sensor arrangement can be constructed so that the catch mechanism comprises a locking element engaging with the at least one adjustment element on the one hand and engaging with a locking element carrier on the other hand. When wear occurs the locking element can be moved by a wear detection element, via an actuating gear unit, out of engagement with the locking element carrier, which engagement forms the catch position, and into a position forming the release position of the catch mechanism, in which it is not engaged with the locking element carrier.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
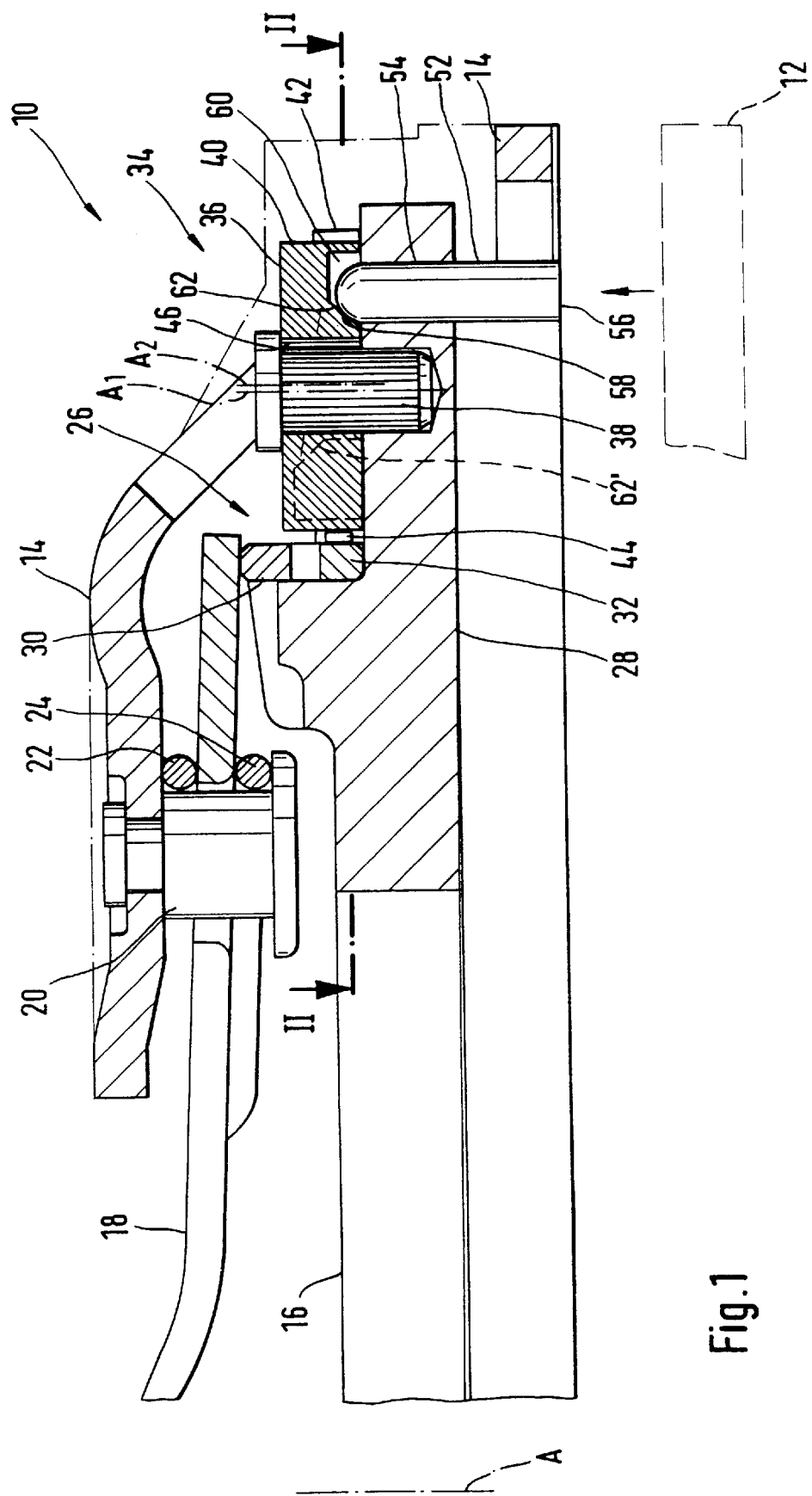
FIG. 1 is a partial longitudinal sectional view through a thrust plate assembly according to the invention.
Figure 2:
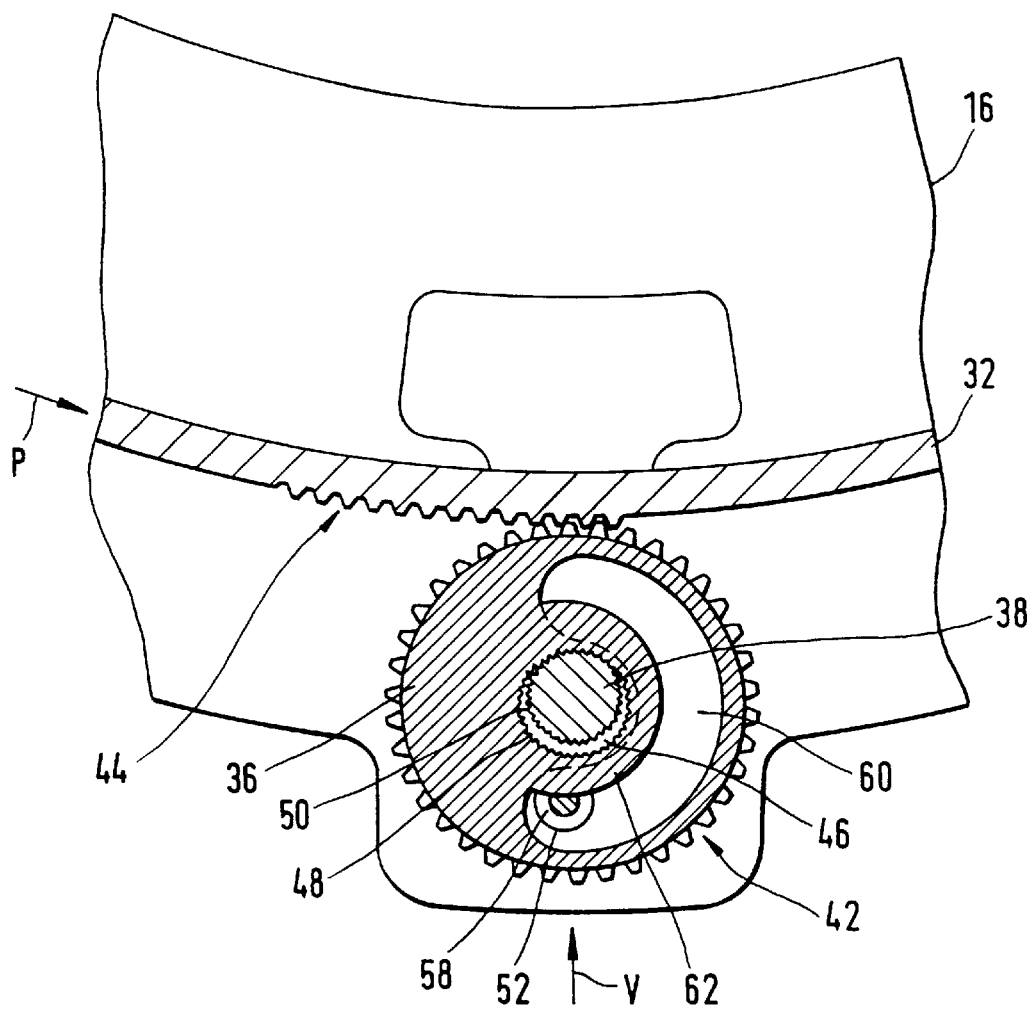
FIG. 2 is a partial cross-sectional view of the thrust plate assembly shown in FIG. 1 along a line II—II.

FIGS. 1 and 2 show, generally, a thrust plate assembly 10, which can be fastened to a flywheel 12, indicated only schematically in FIG. 1, with a housing 14 in the radial outer area of the same by screw bolts or the like. A pressure plate 16 is arranged in the housing 14. The pressure plate 16 is displaceable relative to the housing 14 in the direction of the axis of rotation A, but is held in the housing 14 so as to be rotatable about the axis of rotation A with the housing 14 and accordingly with the flywheel 12. Tangential leaf springs, not shown in the Figures, which act on the pressure plate 16 at the radial outer side and are fastened to the housing 14 are used for this purpose, for example.

An energy accumulator, for example, a diaphragm spring 18 or the like, is supported in a manner known per se in a radial central area by a plurality of carrier pins 20 with the intermediary of wire rings 22, 24 in both axial directions at the housing 14. The diaphragm spring 18 is pretensioned so that it presses on the radial outer side on a wear adjustment device 26, and accordingly presses the pressure plate 16 in the direction of the flywheel 12. The friction facings of a clutch disk, not shown in the Figure, are clamped between a friction surface 28 of the pressure plate 16 and the flywheel 12. For disengagement, the diaphragm spring 18 is pressed in its radial inner area in the direction of the flywheel 12 so that it swivels away from the flywheel 12 in its radial outer area and the pressure plate 16 is accordingly moved away from the flywheel 12 by the pretensioning force of the tangential leaf springs, and the clutch disk is released.

The wear adjustment device 26 comprises two adjustment rings 30, 32. The adjustment ring 32 contacts the pressure plate 16 and is rotatable relative to it. The adjustment ring 30 rests on the adjustment ring 32 and forms the area of application for the radial outer portion of the diaphragm spring 18. The adjustment ring 32 is held so as to be fixed against rotation relative to the diaphragm spring 18 and, therefore, relative to the pressure plate 16. In the mutually contacting area of the two adjustment rings 30, 32, each of the adjustment rings has complementing inclined surfaces constructed in the manner of saw teeth. The two adjustment rings 30, 32 can slide along one another at these inclined surfaces during relative rotation with respect to one another, so that the entire axial extension of the wear adjustment device 26 comprising the adjustment rings 30, 32 is enlarged. At least one pretensioning device, for example, a helical tension spring, acts between the two adjustment rings 30, 32 so as to pretension the two wear adjustment rings 30, 32 with respect to one another in a direction in which they slide along one another by their inclined surfaces and, in so doing, enlarge the axial extension. This relative rotating direction is referred to hereinafter as the wear adjustment direction.

Further, at least one play sensor arrangement 34 is arranged at the pressure plate 16. The play sensor arrangement 34 comprises a locking wheel 36 which is held at the pressure plate 16 by a pin 38. The pin 38 forms a locking wheel carrier and is arranged radially outside of the adjustment rings 30, 32. The locking wheel 36 has a toothing 42 at its outer circumference 40. As can be seen in FIGS. 1 and 2, the toothing 42 meshes with a toothing portion 44 at the adjustment ring 32. The toothing 44 and toothing 42 accordingly form an engagement formation and a counter-engagement formation, respectively, by means of which the locking wheel 36 and adjustment ring 32 are in a constant meshing engagement with one another.

As is shown particularly in FIG. 2, the locking wheel 36 has an inner toothing 48 in the region of the through-opening 46 for the locking wheel carrier 38. The locking wheel carrier 38 has a complementing outer toothing 50 at its outer circumference. The inner diameter of the opening 46 and the outer diameter of the locking wheel carrier 38 are adapted to one another in such a way that the inner toothing 48 does not mesh with the outer toothing 40 when the longitudinal center axis $A_2$ of the opening 46 is aligned with a longitudinal center axis $A_1$ of the locking wheel carrier 38, i.e., when these two components are arranged coaxial to one another. The inner toothing 48 and the outer toothing 50 form a locking engagement formation and a counter-locking engagement formation, respectively, in the play sensor arrangement 34.

The play sensor arrangement further has a wear detection element in the form of an axially displaceable pin 52. The pin 52 penetrates a through-opening 54 in the pressure plate 16 approximately parallel to the axis of rotation A and is guided in this opening virtually without friction. It is noted that the illustrated axial extension of the pin 52 need not necessarily be provided; this pin can also extend at an angle to the axis of rotation A. The pin 52 has a wear detection end 56 by which it contacts the flywheel 12 when wear occurs as will be described hereinafter. Further, the pin 52 has, at its opposite end, a disengagement portion 58 which engages in a circumferential recess 60 in the locking wheel 36. The circumferential recess 60 extends around the opening 46 in the locking wheel 36 in an arc-shaped manner and is open toward the pressure plate 16. The circumferential recess 60 is defined radially inwardly, with respect to the center axis $A_2$ of the opening 46, by a conical disengagement surface 62 with which the disengagement portion 58 of the pin 52 can come into contact. Further, as is indicated by dashed lines in FIG. 1, the circumferential recess 60 is formed in such a way that it becomes increasingly deeper starting from its end shown at the bottom in the view in FIG. 2. As the depth of the circumferential recess 60 increases, the conical disengagement surface 62 also moves farther inward, i.e., it follows the bottom of the circumferential recess 60. This is indicated at 62' in FIG. 1. The disengagement surface 62 accordingly assumes a helical structure.

The operation of the thrust plate assembly 10 according to the invention with automatic wear compensation will be described next. First, it is assumed that the motor vehicle friction clutch outfitted with a thrust plate assembly 10 of the kind mentioned above is in the engaged state shown in FIG. 1. This means that the diaphragm spring 18 loads the wear adjustment device 26 and accordingly presses the pressure plate 16 toward the flywheel 12 with the friction facings of the clutch disk situated therebetween. Due to the pretensioning force of the springs acting between the two adjustment rings 30, 32, the locking wheel 36 has already been displaced radially outwardly in the locking or catch position shown in FIGS. 1 and 2, i.e., in the direction opposite to that indicated by arrow V, by the attempt of the adjustment ring 32 to rotate in the direction of arrow P in FIG. 2 following a preceding clutch release process. The displacing action is caused by the teeth of the toothing 44 which have inclined surfaces and by the correspondingly constructed teeth of toothing 42. Further, a centrifugal force acts on the locking wheel 36 so as to displace this locking wheel 36 radially outwardly likewise in the direction opposite to that indicated by arrow V, so that the inner toothing 48 is forced into engagement with the outer toothing 50 at an area neighboring the adjustment ring 32. In this state, in which the ring 32 is pressed in the direction of arrow P by the pretensioning effect between the adjustment rings 30, 32, the locking wheel 36 cannot rotate further due to the engagement of the inner toothing 48 with the outer toothing 50, because the engagement area between the inner toothing 48 and the outer toothing 50 would have to move around the locking wheel carrier 38 in the clockwise direction with reference to FIG. 2, which would result in a correspondingly eccentric movement of the locking wheel 36. In an eccentric movement of this kind, the portion of the locking wheel 36 located to the left of the locking wheel carrier 38 as seen in FIG. 2 would have to move farther toward the adjustment ring 32, but this is impossible because of the limited engagement depth of the toothing 42 with the toothing 44. Thus, in this state there occurs a self-locking of this gear unit formed of the locking wheel carrier 38, the locking wheel 36 and the adjustment ring 32.

When wear occurs in the friction facings of the clutch disk during operation and the end 56 of the pin 52 acting as a wear detection element contacts the flywheel 12, the pin 52 is gradually pushed farther into the circumferential recess 60 due to the occurring wear and the decreasing distance between the pressure plate 16 and the flywheel 12. The pin 52 presses with its disengagement portion 58 against the disengagement surface 62 at the locking wheel 36 and accordingly displaces the wheel 36 in the direction of arrow V in FIG. 2. Past a certain degree of wear, the displacement in the direction V is extensive enough that the inner toothing 48 disengages from the outer toothing 50 at the locking wheel carrier 38. This displacement toward the radial inside in the direction V is possible because, as is shown in FIG. 2, the inner toothing 48 and the outer toothing 50, on the one hand, and the toothing 42 and the toothing 44, on the other hand, are adapted to one another, respectively, in such a way that in the locking or catch position shown in FIG. 2, in which the outer toothing 50 meshes with the inner toothing 48, the toothing 42 engages with the toothing 44, and, proceeding from this minimum engagement depth of the toothing 42 in the toothing 44, a radially inwardly directed displacement of the locking wheel 36 in direction V is possible, wherein the engagement between the inner toothing 48 and the outer toothing 50 is canceled when a threshold engagement depth between the toothing 42 and the toothing 44 is exceeded.

If the clutch is subsequently in a state in which wear has occurred and the locking wheel 36 has been moved radially outward out of its locking position into a release position through the cooperation of the disengagement portion 58 with the conical disengagement surface 62, i.e., if the diaphragm spring 18 releases the wear adjustment device 26, the ring 32 can rotate in the direction of arrow P in FIG. 2 while carrying along the locking wheel 36 due to the pretensioning force of the springs acting between the rings 30, 32. In this case, the locking wheel 36 rotates in the clockwise direction as seen in FIG. 2. As a result of the rotating movement, the inner toothing 48 is engaged again with the outer toothing 50 and the disengagement surface 62 is displaced on the disengagement portion 58 of the pin 52. Due to the fact that the disengagement surface 62 is constructed in a helical shape, as was already mentioned, this displacement results in that the locking wheel 36 can be displaced again radially outwardly by the above-described force applied by the adjustment ring 32 and the action of centrifugal force due to the fact that the disengagement surface 62 is now at a greater depth following the rotation of the locking wheel 36 in the area of the pin 52. That is, the locking or catch position which can be seen in FIG. 2 is achieved again, wherein a further rotation of the adjustment ring 32 is blocked by the locking wheel 36 even when the wear adjustment device 26 is not acted upon by the diaphragm spring 18.

Thus, a stepwise wear adjustment takes place in the thrust plate assembly 10 according to the invention, wherein the step height depends on the quantity of teeth by which the inner toothing 48 and outer toothing 50 rotate relative to one another during an adjustment process. Therefore, in the thrust plate assembly 10 according to the invention, the ramp-like inclination of the inclined surfaces formed at the adjustment rings 30, 32, the dimensioning of the inner toothing 48 and outer toothing 50, and the pitch of the helical disengagement surface 62 are adapted to or coordinated with one another in such a way that when the pin 52 is displaced to a determined extent as the result of wear, a rotation of the locking wheel 36 which exactly corresponds to this wear and accordingly a rotation of the adjustment ring 32 is brought about with a likewise defined axial adjustment of the wear adjustment device 26.

Thus, in the thrust plate assembly 10 according to the invention, the play sensor arrangement 34 forms a catch mechanism which is moved out of a locking or catch position into a release position, depending on the state of wear, by an actuating gear unit formed by the pin 52 and its disengagement portion 58 and the conical disengagement surface 62 and is returned to the catch position again during or after the wear adjustment. The pretensioning or returning movement into the catch position is carried out by the force applied by the meshing teeth 42, 44, on the one hand, and by the effect of centrifugal force on the locking wheel 36 on the other hand. Depending on the arrangement of the teeth 42, 44, however, the restoring action into the catch position by the action of centrifugal force may be given precedence. The movement out of the catch position into the release position is carried out by means of the above-mentioned actuating gear unit against the action of centrifugal force.

The thrust plate assembly 10, according to the invention, provides a high degree of protection against unwanted movement of the catch mechanism out of its catch position into a release position in a relatively simple construction because, unlike the prior art, it does not make use of a frictional clamping fit, which is cancelled relatively easily by unwanted movements, for holding the play sensor in a defined manner in an instantaneous position corresponding to wear, but rather the play sensor arrangement which is constructed in the manner of a catch mechanism defines the respective position of the same and that of the wear adjustment device.

Various modifications of the thrust plate assembly 10 according to the invention are possible. For example, the locking wheel carrier can be fastened to the housing rather than to the pressure plate, in which case it is not displaceable with respect to the pressure plate in the circumferential direction and in the radial direction. However, the toothing 42 and the toothing 44 must then have an axial extension such that the axial movement occurring between the pressure plate 16 and the housing 14 does not lead to a disengagement of these teeth. Further, it is self-evident that, rather than a single play sensor of the type mentioned above, a plurality of play sensor arrangements can be arranged so as to be distributed in the circumferential direction. Also, it is not compulsory to provide adjustment rings in the wear adjustment device. Rather, one adjustment ring or also individual wedge-like elements can be provided which then cooperate respectively with a locking wheel. These individual wedge-like elements need not necessarily extend in the circumferential direction, but rather can also extend radially, for example, so that when wear occurs at least one of the adjustment rings is moved, with respect to the axis of rotation A, in the radial direction or at least in a direction containing a radial component. It is also noted that the engagement formation, the counter-engagement formation, the locking engagement formation and the counter-locking engagement formation need not necessarily be formed by teeth; knurling or other formations having a positive-locking action can also be used. Also, the teeth can be shaped in accordance with requirements. For example, it is possible to use sawtooth-shaped teeth.

An arrangement in which the locking wheel carrier 38 and therefore the locking wheel 36 are arranged radially inside the adjustment rings 30, 32 is also possible. In this case, one of the adjustment rings, for example, the adjustment ring 32, has an inner toothing portion corresponding to the toothing 44. In the normal engaged state of the clutch, the locking wheel 36 is then pressed radially outward again by the action of centrifugal force, so that its inner toothing engages with the outer toothing at the locking wheel carrier in a radial inner area. In this case, this also defines a state of maximum engagement depth of the toothing 42 at the outer circumferential surface 40 of the locking wheel 36 with the inner toothing portion at the adjustment ring 32. For disengagement, i.e., to cancel the engagement between the inner toothing 48 and the outer toothing 50, the locking wheel 36 is displaced radially inward again via the pin 52 or a corresponding component, wherein the toothing 42 and the corresponding toothing at the adjustment ring 32 are brought into their state of minimum engagement depth. In other respects, the basic manner of operation corresponds to that described above.

The invention is not limited by the embodiments described above which are presented as examples only but can be modified in various ways within the scope of protection defined by the appended patent claims.

We claim:

1. A thrust plate assembly, for a motor vehicle friction clutch having a clutch disk and a flywheel, comprising:
    a housing fastenable to the flywheel for common rotation about an axis of rotation;
    a pressure plate arranged within the housing so as to be fixed with respect to rotation relative to the housing and axially displaceable;
    an energy accumulator having a first side supported at the housing and a second side supported at the pressure plate so as to press the pressure plate toward the flywheel;
    a wear adjustment device arranged in a support path of the energy accumulator and which has at least one adjustment element which is circumferentially displaceable for purposes of wear adjustment and is pretensioned in a wear adjustment direction and has an engagement formation; and
    at least one play sensor arrangement operatively arranged for detecting wear occurring during operation in friction facings of the clutch disk, which friction facings are clampable between the pressure plate and the flywheel, and for adjusting to detected wear in cooperation with the wear adjustment device, the at least one play sensor arrangement including a locking element with a counter-engagement formation that engages the engagement formation, and with a locking engagement formation that is engageable in a detachable manner with a counter-locking engagement formation that is stationary relative to the pressure plate in order to lock the at least one adjustment element with respect to movement in the wear adjustment direction, the locking element comprising a locking wheel mounted on a locking element carrier that is not displaceable with respect to the pressure plate and the housing in either one of the circumferential direction and the radial direction, the at least one play sensor arrangement further including a wear detection element operatively arranged to move the locking element when wear occurs while the counter-engagement formation remains engaged with the engagement formation so that the locking engagement formation can be disengaged from the counter-locking engagement formation.

2. A thrust plate assembly according to claim 1, wherein the energy accumulator is a diaphragm spring.

3. A thrust plate assembly according to claim 1, wherein the engagement formation and the counter-engagement formation comprise one of a toothing and a knurling.

4. A thrust plate assembly according to claim 1, wherein the locking engagement formation and the counter-locking engagement formation comprise one of a toothing and a knurling.

5. A thrust plate assembly according to claim 1, wherein the locking element carrier is parallel to the axis of rotation.

6. A thrust plate assembly according to claim 1, wherein the adjustment element is an adjusting ring.

7. A thrust plate assembly according to claim 1, wherein the locking element has a receiving opening for the locking element carrier, the locking engagement formation being formed at an inner circumferential surface of the receiving opening, and the counter-locking engagement formation being formed at an outer circumferential surface of the locking element carrier.

8. A thrust plate assembly according to claim 7, wherein the inner circumference of the receiving opening and the outer circumference of locking element carrier are adapted to one another so that the locking engagement formation is disengaged from the counter-locking engagement formation when the receiving opening and the locking element carrier are approximately concentric to one another.

9. A thrust plate assembly according to claim 1, wherein the locking element is engageable via the locking engagement formation with the counter-locking engagement formation by engagement of the counter-engagement formation with the engagement formation via the at least one adjustment element which is pretensioned in the wear adjustment direction.

10. A thrust plate assembly according to claim 1, wherein the wear detection element has a disengagement portion in contact with a disengagement surface of the locking element so that the wear detection element is displaceable with respect to the locking element and moves the locking element in order to undo engagement of the locking engagement formation with the counter-locking engagement formation.

11. A thrust plate assembly according to claim 10, wherein the disengagement surface is inclined with respect to a displacement direction of the wear detection element.

12. A thrust plate assembly according to claim 10, wherein the adjustment element is displaceable in a circumferential direction for wear adjustment, the locking element carrier being parallel to the axis of rotation, the locking element having a receiving opening for the locking element carrier, the locking engagement formation being formed at an inner circumferential surface of the receiving opening, and the counter-locking engagement formation being formed at an outer circumferential surface of the locking element carrier, the locking element having a recess which surrounds at least some areas of the receiving opening, and a surface bordering the recess that is conically shape and forms the disengagement surface at least in some areas.

13. A thrust plate assembly according to claim 12, wherein the recess has a depth which changes in a circumferential direction around the receiving opening, the disengagement surface having a helical shape.

14. A thrust plate assembly according to claim 1, wherein an engagement depth of the engagement formation in the counter-engagement formation is changeable so that, at minimum engagement depth, the locking engagement formation engages with the counter-locking engagement formation, and in that when a threshold engagement depth between the engagement formation and counter-engagement formation is exceeded the locking engagement formation disengages from the counter-locking engagement formation.

15. A thrust plate assembly according to claim 1, wherein the locking engagement formation of the locking element is configured to be pressed in engagement with the counter-locking engagement formation by a centrifugal force occurring during operation, the wear detection element being arranged to move the locking element opposite to the action of centrifugal force when wear occurs, so that the locking engagement formation disengages from the counter-locking engagement formation.

16. A thrust plate assembly for a motor vehicle friction clutch with a flywheel, comprising:

a housing fastenable to the flywheel for common rotation about an axis of rotation;

a pressure plate arranged within the housing so as to be fixed with respect to rotation relative to the housing and axially displaceable;

an energy accumulator having a first side supported at the housing and a second side supported at the pressure plate so as to press the pressure plate toward the flywheel;

a wear adjustment device arranged in a support path of the energy accumulator and which has at least one adjustment element which is circumferentially displaceable for purposes of wear adjustment and is pretensioned in a wear adjustment direction; and at least one play sensor arrangement with a catch mechanism, the at least one play sensor arrangement being operatively arranged to prevent the at least one adjustment element from moving in the wear adjustment direction and, when wear occurs, to allow a displacement of the at least one adjustment element in the wear adjustment direction, so that the catch mechanism is pressed by a centrifugal force occurring during operation into a catch position which blocks a displacement of the at least one adjustment element in the wear adjustment direction, and when wear occurs, the catch mechanism is moved out of the catch position into a release position allowing displacement of the at least one adjustment element in the wear adjustment direction, the catch mechanism including a locking wheel mounted on a locking element carrier, the locking wheel being engageable with the at least one adjustment element.

17. A thrust plate assembly according to claim 16, wherein the energy accumulator is a diaphragm spring.

18. A thrust plate assembly according to claim 16, and further comprising a wear detection element and an actuating gear unit operatively arranged to move the locking element out of engagement with the locking element carrier when wear occurs, the engagement forming the catch position, and into a position forming the release position of the catch mechanism, in which the locking element is not engaged with the locking element carrier.

* * * * *